US012645591B2

(12) United States Patent
Roberts

(10) Patent No.: US 12,645,591 B2
(45) Date of Patent: Jun. 2, 2026

(54) NEAR-CACHE COMPUTE

(71) Applicant: Micron Technology, Inc., Boise, ID (US)

(72) Inventor: David Andrew Roberts, Wellesley, MA (US)

(73) Assignee: Micron Technology, Inc., Boise, ID (US)

( * ) Notice: Subject to any disclaimer, the term of this patent is extended or adjusted under 35 U.S.C. 154(b) by 146 days.

(21) Appl. No.: 18/775,715

(22) Filed: Jul. 17, 2024

(65) Prior Publication Data

US 2026/0104999 A1 Apr. 16, 2026

Related U.S. Application Data

(60) Provisional application No. 63/532,824, filed on Aug. 15, 2023.

(51) Int. Cl.
G06F 12/0802 (2016.01)

(52) U.S. Cl.
CPC .. G06F 12/0802 (2013.01); G06F 2212/1008 (2013.01)

(58) Field of Classification Search
CPC .................... G06F 12/0802; G06F 2212/1008
See application file for complete search history.

(56) References Cited

U.S. PATENT DOCUMENTS

| | | | |
|---|---|---|---|
| 7,321,955 | B2 | 1/2008 | Ohmura |
| 8,627,007 | B1 | 1/2014 | Huang et al. |
| 11,886,728 | B2 | 1/2024 | Brewer et al. |
| 2015/0039836 | A1 | 2/2015 | Wang et al. |
| 2015/0186275 | A1* | 7/2015 | Moga .................. G06F 12/0811 711/122 |
| 2018/0075069 | A1* | 3/2018 | Guim Bernat ...... G06F 12/0875 |
| 2022/0050785 | A1 | 2/2022 | Moyer et al. |
| 2022/0138110 | A1* | 5/2022 | Dropps ............... G06F 12/0873 711/154 |

FOREIGN PATENT DOCUMENTS

| | | |
|---|---|---|
| CN | 102831088 | 12/2012 |

OTHER PUBLICATIONS

"International Application Serial No. PCT US2024 038383, International Search Report mailed Oct. 28, 2024", 3 pages.
"International Application Serial No. PCT US2024 038383, Written Opinion mailed Oct. 28, 2024", 3 pages.
Conway, Pat, "Cache Hierarchy and Memory Subsystem of the Amd Opteron Processor", IEEE Micro ( vol. 30, Issue: 2, (Apr. 12, 2010), 14 pages.

* cited by examiner

Primary Examiner — Tracy A Warren
Assistant Examiner — Jason Michael Pinga
(74) Attorney, Agent, or Firm — Schwegman Lundberg & Woessner, P.A.

(57) ABSTRACT

Near-cache compute can be implemented by a device that includes an interface configured to communicate with external entities and processing circuitry configured to receive a recall count request, from an entity on the interface. Here, the recall count request can specify a data object that is represented by a set of cache lines on the device. The device can tabulate a number of cache lines in the set of cache lines that are inconsistent to create a recall count and communicate a response to the entity via the interface that includes the recall count.

20 Claims, 7 Drawing Sheets

605 — RECEIVE RECALL COUNT REQUEST FOR AN OBJECT

610 — TALLY CACHE LINES FOR THE OBJECT THAT ARE NOT CURRENT

615 — RESPOND TO RECALL COUNT REQUEST WITH THE NUMBER OF CACHE LINES THAT ARE NOT CURRENT

NEAR-CACHE COMPUTE

PRIORITY APPLICATION

This application claims the benefit of priority to U.S. Provisional Application Ser. No. 63/532,824, filed Aug. 15, 2023, which is incorporated herein by reference in its entirety.

TECHNICAL FIELD

Embodiments described herein generally relate to computer memory and more specifically to near-cache compute.

BACKGROUND

Memory devices for computers or other electronic devices can be categorized as volatile and non-volatile memory. Volatile memory uses power to maintain its data (e.g., is periodically refreshed), and includes random-access memory (RAM), dynamic random-access memory (DRAM), or synchronous dynamic random-access memory (SDRAM), among others. Non-volatile memory generally retains stored data in the absence of a power source, and includes flash memory, read-only memory (ROM), electrically erasable programmable ROM (EEPROM), static RAM (SRAM), erasable programmable ROM (EPROM), resistance variable memory, phase-change memory, storage class memory, resistive random-access memory (RRAM), and magnetoresistive random-access memory (MRAM), among others. Persistent memory is an architectural property of the system where the data stored in the media is available after system reset or power-cycling. In an example, non-volatile memory media can be used to build a system with a persistent memory model.

Memory devices can be coupled to a host (e.g., a host computing device) to store data, commands, or instructions for use by the host while the computer or electronic system is operating. For example, data, commands, or instructions can be transferred between the host and the memory device during operation of a computing or other electronic system.

Various protocols or standards can be applied to facilitate communication between a host and one or more other devices such as memory buffers, accelerators, or other input/output devices. In an example, an unordered protocol, such as Compute Express Link (CXL), can be used to provide high-bandwidth and low-latency connectivity. Other protocols that can be used for this purpose include Gen-Z, RapidIO, Peripheral Component Interconnect Express (PCIe), or Open Coherent Accelerator Processor Interface (OpenCAPI), among others.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
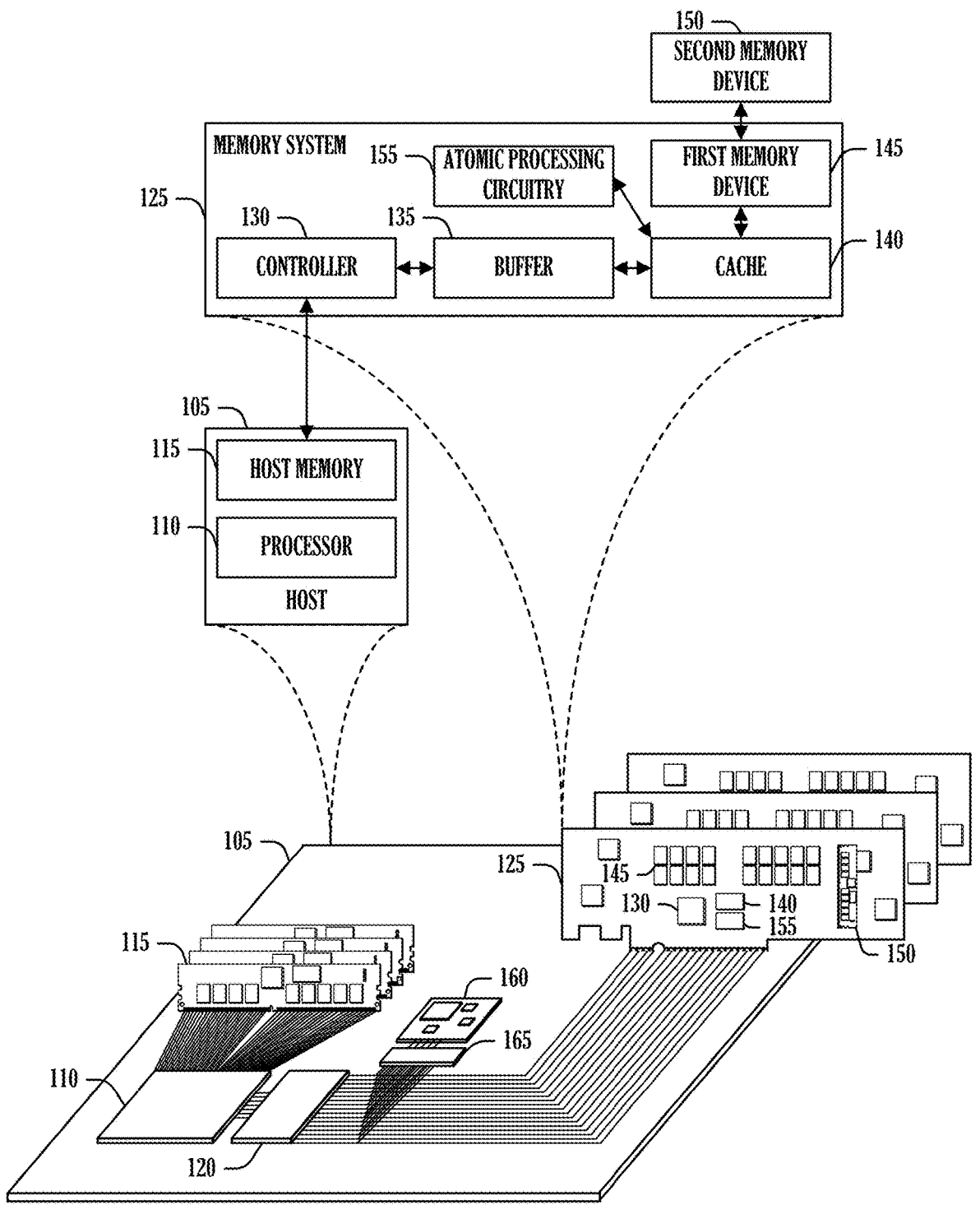
FIG. 1 is a block diagram of an example of an environment including a system for near-cache compute, according to an embodiment.

Compute Express Link (CXL) is an open standard interconnect configured for high-bandwidth, low-latency connectivity between host devices and other devices such as accelerators, memory buffers, or smart input-output (I/O) devices. CXL was designed to facilitate high-performance computational workloads by supporting heterogeneous processing and memory systems. CXL provides memory semantics and mechanisms for cache coherency on top of PCIe-based I/O semantics for optimized performance. Although the examples below use CXL, other standards, such as Gen-Z, RapidIO, or OpenCAPI, can be used instead.

Due to timing flexibility provided by CXL memory devices over more traditional memory connection architectures, CXL memory devices can better realize near-memory compute architectures. Near-memory computing is an architectural design approach in high-performance computing, where computation elements (like processors or specialized compute units) are moved closer to the memory, significantly reducing the time and energy needed to fetch data. This architecture aims to tackle the von Neumann bottleneck, a limitation in traditional computing systems where the speed of data transfer between the CPU and memory becomes the performance bottleneck. By integrating computation and memory units more closely, near-memory computing can significantly improve data-intensive applications' performance by reducing data movement and lowering latency. This is particularly beneficial in modern applications like artificial intelligence and machine learning, which involve processing vast amounts of data.

CXL can be a useful component in a variety of applications such as artificial intelligence, machine learning, analytics, cloud infrastructure, edge computing devices, communication systems, and elsewhere, to provide flexible connectivity to memory or accelerators for a host processor platform. Data processing in such applications can use various scalar, vector, matrix, or spatial architectures that can be deployed in CPU, GPU, FPGA, smart NICs, or other accelerators that can be coupled using a CXL link. Near memory accelerators, in which an accelerator is collocated with memory, provide low latency processing while expanding system capabilities.

In architectures with caching at various entities—such as host devices (e.g., central processing unit (CPU), graphic processing unit (GPU), or other components accessing a memory device), memory devices (e.g., including near-memory compute memory devices), accelerators (e.g., static or programmable (e.g., a field programmable gate array (FPGA))—a data object stored in a memory can be out-of-sync with some of the caches. A cache coherency protocol can be used to ensure that out-of-date data is not used. Here, some mechanism is employed to inform an entity that the data is out-of-date—provoking the entity to refresh the data from the memory—to provoke an entity changing the data to write-back current data, to lock inconsistent data, etc. CXL is a cache-coherent interconnect protocol.

While cache coherency can prevent the use of out-of-date data, there is generally a cost to the cache coherency operations. For example, if a local copy of the data is out-of-date, the cache coherency protocol will operate to request an updated version of the data from memory. It is possible that the version in the memory is also out of date. Here, the memory attempts to provoke the writing entity to writeback the data to the memory. After the data is written back, the memory can then respond with the up-to-date data. It is also possible, but not required that, devices can cache each other's memory contents. In cache-coherent systems, the up-to-date (Modified) copy of the data may not be present in memory, for example, the copy of the data is not visible to all caching agents; rather, the data copy only exists in another processor's cache.

In general, cache coherence protocols—such as the Modified, Exclusive, Shared or Invalid (MESI) protocol used in CXL—assign a state to each cache line in a cache. In an example, an on-chip probe filter or in-memory directory can keep track of which other caches in a system have a copy of a cache line, and in which state (e.g., Modified, Exclusive, Shared or Invalid).

As noted above, functions computed near memory can incur significant latency if a large amount of data upon which the function operations reside in the caches of other entities (e.g., host or peer NMC-capable devices). The latency arises because, before data can be processed, modified data is recalled (e.g., written back) from the remote caches. Without a local coherence directory tracking where the latest copy of data is (e.g., using the CXL protocol), the entity can be limited to waiting for probe responses to return from all potential caching devices before proceeding to read shared data.

To address these issues, a form of near-cache compute is implemented. Near-cache compute acknowledges that different entities can host processing capabilities and hold the relevant data to execute a function. These entities expose interfaces that enable an orchestrator (e.g., host running a program that includes the function) to determine which of the several entities has the relevant data. Here, the relevant data determination is based on a recall count, or how much of the data requires a refresh from an external source, before the function can execute. In general, the entity (barring other considerations) that has the most current data—the smallest recall count—will be selected to execute the function (e.g., routine, block, or other unit of an executable program).

When compared to traditional near-memory compute architectures, the near-cache architecture includes instructions—for example on both host devices and memory devices—missing from these traditional systems. These instructions can include the return of the number of cache lines that would be probed or written back to memory from remote caches before the data could be computed on locally. When the architecture supports the recall count instructions, the entities (e.g., including software running on a host or a processor of the memory device) can use the counts in branching behavior, or other behavior, that selects where (e.g., what device) an aspect (e.g., function) of an executable is run. Because the near-cache architecture enables a determination whether it is faster to execute a function locally or on a remote device, for various devices, near-cache compute improves software execution performance. Additional details and examples are provided below.

FIG. 1 illustrates an example of an environment including a system 105 for hybrid coherency, according to an embodiment. The system 105 includes a first host 110 (e.g., central processing unit (CPU)) and a second host 160 (e.g., an accelerator), and a memory system 125. The first host 110 may have directly attached host memory 115 in the system 105. In an example, the system 105 is, or is part of, a server computer, workstation, personal laptop computer, a desktop computer, a digital camera, a smart phone, a memory card reader, Internet-of-thing enabled device, or the like. The first host 110 or the second host 160 can include one or more processor cores, a system of parallel processors, or other CPU arrangements.

The memory system 125 includes a controller 130, a buffer 135 (e.g., internal state memory), a cache 140, and a first memory device 145. The first memory device 145 can include, for example, one or more memory modules (e.g., single in-line memory modules, dual in-line memory modules, etc.). The first memory device 145 can include volatile memory or non-volatile memory. The first memory device 145 can include a multiple-chip device that comprises one or multiple different memory types or modules. In an example, the system 105 includes a second memory device 150 that interfaces with the memory system 125 and the first host 110.

The system 105 can include a backplane and can include a number of processing resources (e.g., one or more processors, microprocessors, or some other type of controlling circuitry) including, or in addition to, the first host 110 and the second host 160. The system 105 can optionally include separate integrated circuits for the first host 110, the second host 160, the memory system 125, the controller 130, the buffer 135, the cache 140, the first memory device 145, the second memory device 150, any one or more of which can comprise respective chiplets that can be connected and used together. In an example, the system 105 includes a server system or a high-performance computing (HPC) system or a portion thereof. Embodiments of the first host 110, or other components of the system 105, can be implemented in Von Neumann or in non-Von Neumann architectures, which can include one or more components (e.g., CPU, ALU, etc.) often associated with a Von Neumann architecture, or can omit these components.

In an example, the first memory device 145 can provide a main memory for the system 105, or the first memory device 145 can comprise accessory memory or storage for use by the system 105. In an example, the first memory device 145 or the second memory device 150 includes one or more arrays of memory cells, e.g., volatile or non-volatile memory cells. The arrays can be flash arrays with a NAND architecture, for example. Embodiments are not limited to a particular type of memory device. For instance, memory devices can include RAM, ROM, DRAM, SDRAM, PCRAM, RRAM, and flash memory, among others.

In embodiments in which the first memory device 145 includes persistent or non-volatile memory, the first memory device 145 can include a flash memory device such as a NAND or NOR flash memory device. The first memory device 145 can include other non-volatile memory devices such as non-volatile random-access memory devices (e.g., NVRAM, ReRAM, FeRAM, MRAM, PCM). Some memory devices—such as a ferroelectric RAM (FeRAM) device that include ferroelectric capacitors—can exhibit hysteresis characteristics, such as a 3-D Crosspoint (3D XP) memory device, or combinations thereof.

In an example, the interface 120, or the interface 165, can include any type of communication path, bus, interconnect, or the like, that enables information to be transferred between the first host 110 or the second host 160 respectively, or other devices of the system 105, and the memory system 125. Non-limiting examples of interfaces can include a peripheral component interconnect (PCI) interface, a peripheral component interconnect express (PCIe) interface, a serial advanced technology attachment (SATA) interface, a Universal Serial Bus (USB) interface, a Thunderbolt interface, or a miniature serial advanced technology attachment (mSATA) interface, among others. In an example, the interface 120 includes a PCIe 5.0 interface that is compliant with the compute express link (CXL) protocol standard. Accordingly, in some embodiments, the interface 120 supports transfer speeds of at least 32 GT/s.

CXL is a high-speed central processing unit (CPU)-to-device and CPU-to-memory interconnect designed to enhance compute performance. CXL maintains memory coherency between the CPU memory space (e.g., the host memory 115 or caches maintained by the first host 110) and memory on attached devices or accelerators (e.g., the first memory device 145 or the second memory device 150). This arrangement enables resource sharing at higher performance, reduced software stack complexity, and lower overall system cost than other interconnect arrangements. CXL is an industry open standard interface for high-speed communications to accelerators that are increasingly used to complement CPUs in support of emerging data-rich and compute-intensive applications such as artificial intelligence and machine learning. The memory system 125 is illustrated with atomic processing circuitry 155 as an accelerator in order to perform near-memory operations. In general, the atomic memory operations (AMOs) performed by the atomic processing circuitry 155 include such small operations as incrementing a number at a memory address or multiply number in two memory addresses, etc. While AMOs are generally used for such operations, the manipulation of memory is not so restricted. For example, modern artificial neural network architectures generally involve the application of small additive or multiplicative operations or thresholding across vast swaths of artificial neurons. Because the computations are usually simple, but the data large, near memory execution of such operations is possible and beneficial given the illustrated architecture.

In an example, the controller 130 comprises a media controller such as a non-volatile memory express (NVMe) controller. The controller 130 can be configured to perform operations such as copy, write, read, error correct, etc. for the first memory device 145. In an example, the controller 130 can include purpose-built circuitry or instructions to perform various operations. That is, in some embodiments, the controller 130 can include circuitry or can be configured to perform instructions to control movement of data or addresses associated with data such as among the buffer 135, the cache 140, or the first memory device 145 or the second memory device 150.

In an example, at least one of the first host 110 or the controller 130 comprises a command manager (CM) for the memory system 125. The CM can receive a read command for a particular logic row address in the first memory device 145 or the second memory device 150. In an example, the CM can determine that the logical row address is associated with a first row based at least in part on a pointer stored in a register of the controller 130. In an example, the CM can receive, from the first host 110 or the second host 160, a write command for a logical row address. In an example, the write command is associated with second data. In an example, the CM can be configured to issue, to non-volatile memory and between issuing the read command and the write command, an access command associated with the first memory device 145 or the second memory device 150. In an example, the CM can issue, to the non-volatile memory and between issuing the read command and the write command, an access command associated with the first memory device 145 or the second memory device 150.

In an example, the buffer 135 comprises a data buffer circuit that includes a region of a physical memory used to temporarily store data, for example, while the data is moved from one place to another. The buffer 135 can include a first-in, first-out (FIFO) queue in which the oldest (e.g., the first-in) data is processed first. In some embodiments, the buffer 135 includes a hardware shift register, a circular buffer, or a list.

In an example, the cache 140 comprises a region of a physical memory used to temporarily store particular data from the first memory device 145 or the second memory device 150. Generally, the cache 140 provides faster access to data than the backing memory. The cache 140 can include a pool of data entries. In an example, the cache 140 can be configured to operate according to a write-back policy in which data is written to the cache without the being concurrently written to the first memory device 145. Accordingly, in some embodiments, data written to the cache 140 does not have a corresponding data entry in the first memory device 145. This can occur when, for example, data is written to the cache and deleted before a write-back is triggered to write the data into the first memory device 145, for example.

Figure 5:
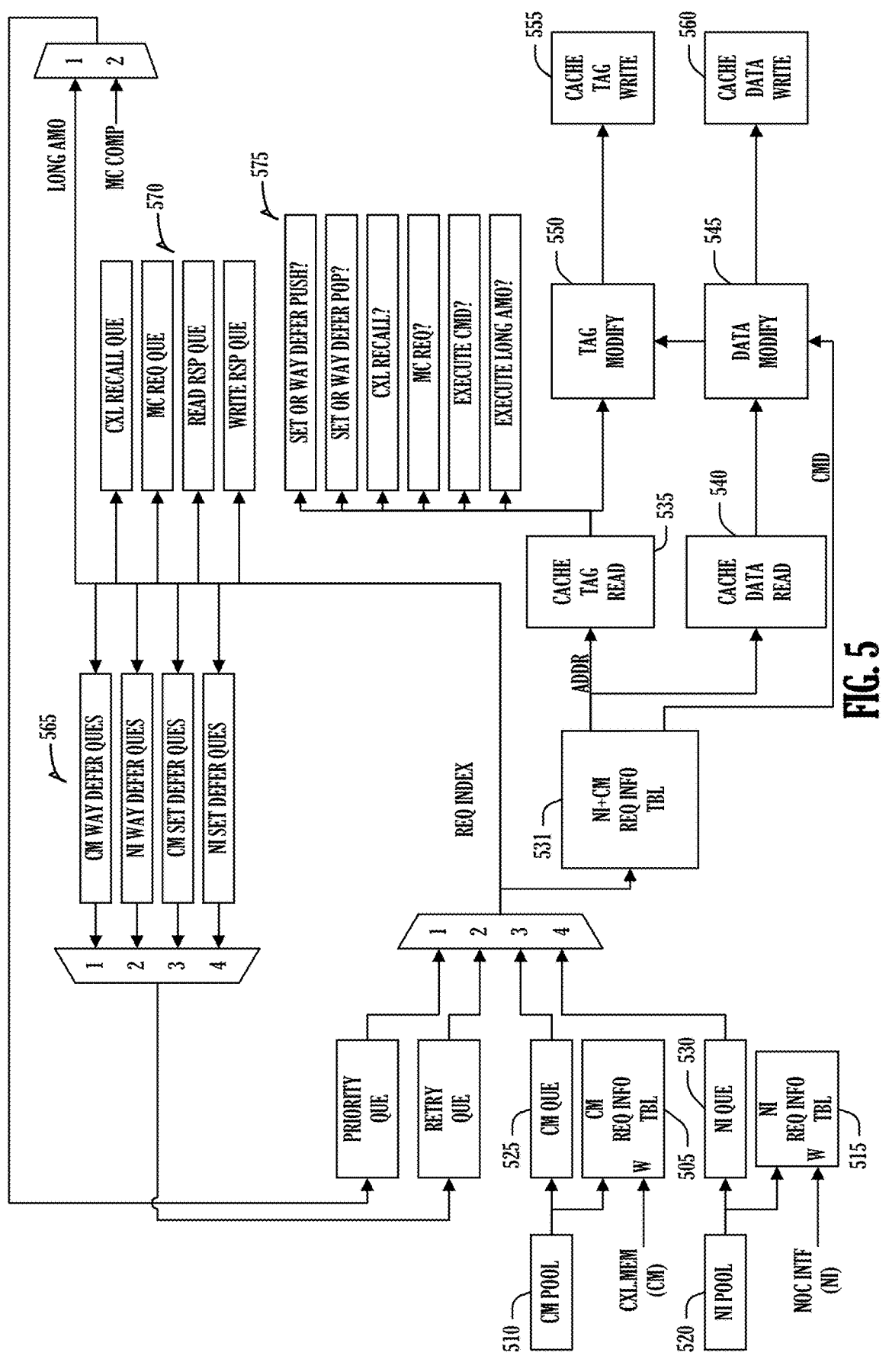
FIG. 5 illustrates example components of a memory device, according to an embodiment.

In an example, the cache 140 is implemented as a multi-way associative cache. Here, cache entries are divided by some portion of a memory address (e.g., a set number of significant bits). A group of cache entries (e.g., cache lines or ways), called a cache set herein, can be co-associated with a same bit-set from the memory address. Usually, the number of ways in a cache set is less than the total number of memory addresses to which the ways are associated. Thus, a way can be evicted to be associated with a new memory address in the range at various points. FIG. 5 illustrates some elements of this type of associate cache.

In an example, the controller 130 can receive write requests involving the cache 140 and cause data associated with each of the write requests to be written to the cache 140. The controller 130 can similarly receive read requests and cause data that is stored in, for example, the first memory device 145 or the second memory device 150, to be retrieved and written to, for example, the first host 110 via the interface 120 or the second host 160 via the interface 165. In an example, the controller 130 processes all requests for memory it controls through the cache 140. Thus, a read request will first check the cache 140 to determine if the data is already cached. If not, a read to the first memory device 145 is made to retrieve the data. The data is then written to the cache 140. In an example, the data is then read from the cache 140 and transmitted to the requesting entity, such as the first host 110 or the second host 160. Working exclusively through the cache can simplify some elements of the controller 130 hardware at the cost of a little latency.

In addition to the above, the controller 130 can be configured to implement near-cache compute. The near-cache compute techniques can be implemented at any device that has a cache and an ability to execute instructions, such as the host 110 or the host 160. However, for simplicity, the following device configurations and corresponding activities for near-cache compute are described from the perspective of the controller 130.

As noted above, near cache-compute involves the counting and sharing of cache lines that need to be updated. Accordingly, at a high level, if the controller 130 has a task that will use a data object (e.g., object), and the task can be executed at the host 110, the controller 130 can inquire as to how many cache lines the host 110 has that need to be updated before the host 110 can execute the task. If that number is greater than the number of cache lines that the controller 130 would need to update, then, barring other considerations—such as processing capacity, speed of execution, energy efficiency, etc.—the controller 130 would execute the task locally rather than at the host 110.

Similarly, if the host 110 had the available task, the host 110 must be able to inquire to the controller 130 as to number of cache lines that are current at the controller 130. Accordingly, the controller 130 (e.g., the circuitry therein) is configured to receive a recall count request, for example, on an interface of the memory system 125 from an entity (e.g., host 110). This recall count request specifies a data object. The data object is a unit of data, such as a sensor measurement, data structure, number, etc., that is logically united, for example, in the software or hardware that consumes the data object. While the data object can be represented by a single cache line, as would often be the case with integer primitive, data objects often span multiple memory words and thus multiple cache lines. Accordingly, in an example, the data object is represented by a set of cache lines in the cache 140.

There are a variety of techniques that can be used to specify (e.g., identify) the data object. While any can be used that enables the controller 130 and the host 110 to determine that the same data object is being considered, typical approaches of a Universal Unique Identifier (UUID) or other identifier techniques can be used. In an example, the data object is specified by one or more memory addresses.

In the context of a memory system 125, memory addresses provide a convenient and efficient identification technique because the same memory address—at least logical memory address—is generally used on processors and memory. Thus, it is likely that the host 110 is referring to the same data object as the controller 130 when a memory address is used to identify the data object. Moreover, the address is usually used to correlate the memory address to a given cache line. Thus, the identification of cache lines that are important to near-cache compute is simplified over the use of an ID.

In an example, the one or more memory addresses are a memory address range. This example often enables a more efficient identification of the elements (e.g., memory words) of the data object when the data object is contiguous. Often, the host 110 (or other entity writing a data object to the memory system 125) will define data objects as a contiguous block of logical memory addresses.

The controller 130 is configured to tabulate (e.g., count) the number of cache lines (e.g., in the cache 140) that both correspond to the data object and are in an inconsistent state. An inconsistent state (or a cache line being inconsistent) means that the cache line may not be current. For example, if the host 110 requests exclusive access to a memory word from the memory system 125, a typical operational flow can include the controller 130 retrieving the memory word from the first memory 145 if the memory word is not already cached in the cache 140. The controller 130 then updates the cache 140 to include the data in the memory word and transmits the data for the memory word to the host 110. The host 110 can write the data in its own local cache. As long as the host 110 has exclusive control of the memory word, the host 110 will generally update the data in the memory word in its own cache until an event occurs that causes the host 110 to write the data back to the memory system 125 to update the data in the first memory 145. Accordingly, during the period preceding the flush and following the exclusive controller, the controller 130 has a version of the data in the memory word in the cache 140 that may not be correct. Thus, this cache line is inconsistent. In the context of the CXL MESI cache coherency protocol, the cache line is inconsistent if it is modified (the M in MESI). As noted above, because data objects often comprise multiple memory words, and thus multiple cache lines, the tabulation of inconsistent cache lines is a count of the number of inconsistent cache lines in a set of cache lines that represent the data object. The result of the tabulation is referred to as a recall count.

The controller 130 is configured to communicate a response to the recall count request. This response includes the recall count. Thus, the host 110 is able to determine how much work (e.g., latency for performing recalls to cause the cache 140 to be consistent (e.g., up-to-date)) is involved with running an operation on the memory system (e.g., the atomic processing circuitry 155) that uses the data object. If the balance of factors favor running the operation on the memory system 125, then the host 110 can make such a request. Thus, in an example, the controller 130 is configured to receive a remote function request from the entity. Generally, the remote function request is sent in response to the recall count being less than an inconsistent cache line count at the entity for the data object. That is, when the recall count on the host 110 is greater than the recall count produced by the controller 130, then the operation (e.g., task) is executed on the memory system 125.

When the operation is run on the memory system 125, the cache 140—upon which the atomic processing circuitry 155 will likely operate—or the memory (e.g., the first memory 145 or the second memory 150) in the case where a cache is not used, is brought up-to-date (e.g., using a back invalidate command in CXL). Accordingly, in an example, the controller 130 is configured to perform a recall operation for the cache lines in the set of cache lines that are inconsistent. Once the data for the data object is consistent in the memory system 125, the memory system 125 can then execute a function (or other code designation, such as a method, block, etc.) specified in the remote function request.

The previous examples involved an entity, such as the host 110, directing where the function for the data object would run. However, the memory system 125 can also be in this position. Accordingly, in an example, the controller 130 is configured to transmit a recall count request to a second entity (e.g., the host 160) that also specifies a data object. The controller 130 is configured to receive a recall count in response to the recall request. The controller 130 is configured to then tabulate a number of local cache lines from a set of cache lines (e.g., in the cache 140) that represent the data object to create a local recall count. Once the controller 130 has both the second recall count and the local recall count, the controller 130 is configured to compare the two recall counts and select a function from a set of functions based on comparing the second recall count and the local recall count.

In an example, comparing the local recall count to the second recall count includes setting a register of the controller 130 (or the host 110 when these operations apply to the host 110) to indicate whether the second recall count is greater than the local recall count. In an example, selecting the function includes executing a branch function that selects the function based on the register. This scenario anticipates a program execution branch facility in the processing circuitry (e.g., of the atomic processing circuitry 155 or the controller 130) that bases the branch location upon the value in the register. Accordingly, in an example, if the register is set, the operation executes locally (e.g., on the memory system 125 in these last examples). If the register is not set, then the operation runs remotely (e.g., on the host 160 in these examples). The contra can also be used (e.g., a set register results in remote execution) depending upon configuration.

In an example, the function is a local function that will execute on the controller 130 when the recall count is greater than the local recall count. In an example, the function is a remote function that will execute on the second entity when the second recall count is less than the local recall count. These examples establish the probably most efficient outcome whereby the function is executed where the cache is most consistent (e.g., current or up-to-date).

When the function runs on the memory system 130, the memory system 125 is operating as a near-memory compute device. Here, a local processor (e.g., the atomic processing circuitry 155 or the like) executes the function. The function can update the data in the data object (e.g., change the data stored in the first memory device 145) or return a result of a manipulation (e.g., encrypting the data in the data object) without changing the underlying data in the first memory 145.

The above techniques generally result in reduced latencies by reducing the amount of cache updating used to execute a function that operates on a data object. Accordingly, the near-cache computing, rather than mere near-memory computing, provides a more sophisticated execution location decision leading to improved performance of computing systems.

Figure 2:
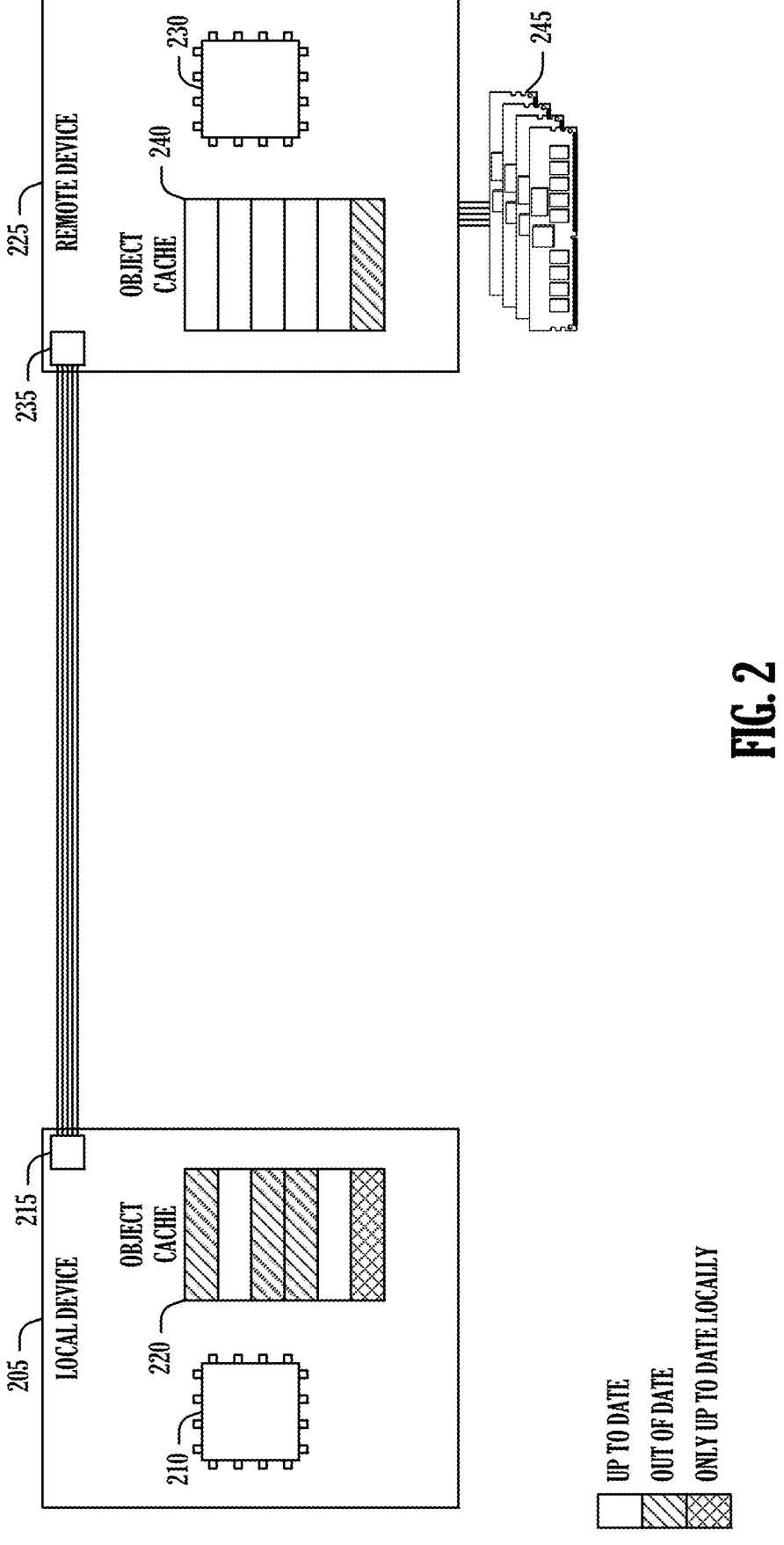
FIG. 2 illustrates a local device accessing a recall count on a remote device to determine where to execute an operation, according to an embodiment.

FIG. 2 illustrates a local device 205 accessing a recall count on a remote device 225 to determine where to execute an operation, according to an embodiment. The local device 205 is in communication with the remote device 225 via the interface 215 and the interface 235 to an interconnect, such as CXL.

Here, the local device 205 is executing a program (e.g., in the processor 210 or other processing circuitry) that has a segment that could run on the remote device 225 (e.g., in the processor 230 of other processing circuitry). As illustrated, the remote device 225 is a memory system that includes, or is in control of, the memory 245 that serves as the backing storage of the object cache 220 on the local device 205 and the object cache 240 on the remote device 225.

The object caches include several cache lines, the consistency of which are denoted by shading. Accordingly, as illustrated, the object cache 220 has three cache lines that are inconsistent and three that are consistent. The only-up-to-date-locally designation ensures that all other entities will likely not be consistent on that cache line because the local device 205 has exclusive control of the cache line and has changed the data in the cache line. In the illustrated scenario, it is likely that the local device 205 will select the remote device 225 to run the code segment.

In the illustrated context, it can be understood that new processor instructions or interconnect protocol commands are used to enable near-cache computing. For example, new "Recall count" instructions are defined—available on all participating devices (e.g., the local device 205 and the remote device 225)—that return to the requestor the number of cache lines, or bytes, of modified data that must be written back from remote locations (e.g., caches on other devices)

for the function to execute on the target device. In an example, the function can be a command as part of the device interconnect protocol.

Consider a situation in which the local device 205 is motivated to have the near-memory processor 230 run a function. The motivation can arise from performance or energy advantages in running the function remotely. However, the local device 205 had previously generated some input data for the function that now exists only in the object cache 220 as dirty data (the only-up-to-date-locally designation). To run the function on the remote device 225, either the local device 205 must flush the dirty data back to the remote device 225, or the remoted device 225 must read (e.g., recall or evict) the modified data from the local device 205 to use as its input. If the local device 205 ran the function itself, then any input data not already cached (the illustrated out-of-date designations in the object cache 220 or missing cache lines altogether) would have to be read from the remote device 225 or written back from device-side caches.

The following commands (e.g., instructions) can be used to implement the near-cache compute recall counts between participating devices. In an example, in the following instructions, return values can be written to a destination register specified by the instruction. In an example, the instructions can employ a side-effect such as setting or clearing a bit in the processor condition register, as a response.

Instruction: recall_count_local
Parameters: Virtual address range, physical address range, object identifier, or extent identifier.
Return Value: The number of cache lines or Bytes of data needed to be recalled from remote caches to execute a function locally on the device executing the instruction.
Instruction: recall_count_remote
Parameters: Virtual address range, physical address range, object identifier, or extent identifier.
Return Value: The number of cache lines or Bytes of data needed to be written back from local caches to the device, to execute a function remotely on that device.

The parameters for these two instructions represent a range of shared memory addresses expressed in different formats. Each format may have its own variant of the instruction. For example, with a virtual address range, the function parameters include a range of virtual addresses (e.g., specified by a start and end). When using virtual addresses, the implementation can first translate the virtual addresses to physical addresses using Address Translation Service (ATS) commands (if requestor is CXL device-side), or Translation Lookaside Buffer (TLB) lookups and page table walks (if requestor is processor-side).

When the physical address range is used, the function can use a range of physical addresses (e.g., start, end). When an object or extent identifier is used, the ID represents a configured range of address, such that the parameter is a single value.

Instruction: test_modified_count
Parameters: Virtual address range, physical address range, object identifier, or extent identifier.
Effect (no return): This instruction sets a new flag (e.g., an "M" bit) in the processor's condition code register (CCR) if the number of local cache lines in the Modified state exceeds the specified count. Conditionally executed instructions, or branch instructions, can use that flag as a condition to determine whether to branch (e.g., execute one of two different functions depending on the modified count). Here, the two functions are local or remote, as opposed to performing different operations on the data object.

Instruction: test_dirty_count

Parameters: Virtual address range, physical address range, object identifier, or extent identifier.

Effect (no return): This instruction sets a new flag (e.g., an "M" bit) in the processor's condition code register (CCR) if the number of local cache lines in the dirty state exceeds the specified count. Conditionally executed instructions, or branch instructions, can use that flag as a condition to determine whether to branch (e.g., execute one of two different functions depending on the modified count). Here, the two functions are local or remote, as opposed to performing different operations on the data object.

Instruction: writeback_conditional

Parameters: Virtual address range, physical address range, object identifier, or extent identifier.

Effect (no return): If the M bit is set in the condition code register, all modified cache lines within the specified address range are written back. In an example, the effect can also include the clearing of the M bit afterwards. In an example, the clearing is also based on a bit or other signal in the instruction.

Instruction: writeback_and_branch_conditional

Parameters: Virtual address range, physical address range, object identifier, or extent identifier.

Effect (no return): In a single instruction, operate as the write-back conditional instruction and then also branch to a specified program address or address offset if the M bit is set.

System architectural considerations can impact the implementation of these functions. For example, the way each recall_count_local and recall_count_remote instruction works can depend on where directory information—e.g., a table recording which caches have a copy of each cache line address in the system—is located. Host processors typically have a "probe filter" on-chip that tracks the state of cache lines in their coherence domain. This would include near-memory processing devices on a CXL bus. Due to limited capacity, probe filters may not have an entry for a given address and have to assume the memory-side cache may have a modified copy. To get a definitive answer, the local device 205 would have to send a query to the remote device 225.

In addition to host-side probe filters, some near-memory computing devices internally track host ownership state of cache lines in the memory device for regions of interest. This can mirror some state in the host probe filter and enable the near-memory computing device to count remotely modified lines without requesting the host to check its cache state. The near-memory compute device can accomplish this by receiving notifications (e.g., via CXL messages) whenever a host modifies a local-to-the-host cache line. The near-memory computing device can record an "E" exclusive bit in its metadata tracking table. These bits can be cleared when lines are written back to the near-memory computing device from the host. In an example, to avoid having to scan the table counting E bits, the near-memory computing device metadata can include counters such that every extent (e.g., address range data structure) increments and decrements the E count as E bits are set and cleared. Other mechanisms may have to request a scan of their own cache (or request that a remote cache scans its cache) to count the number of Modified lines matching the specified address range in the instruction.

The following pseudo code provides an example usage of some of these instructions. Here, a host (e.g., the local device 205) will execute a function locally if the number of locally Modified lines of the data object to be processed exceeds the number of remotely Modified lines on the remote device 225. Similar code can be used if this code is invoked on a device-side processor, with lines 4 and 6 swapped.

```
1: R=recall count local (ObjectID)
// store the number of device-side modified lines in
   register R
2: test modified count (R)
// Set the M bit in the CCR, if local local-side modified
   lines exceed R
3: Branch Conditional. M( )
// Branch to subroutine if M is set
4: RunFunctionOnDevice( )
// a branch did not occur; accordingly, run function on
   remote device
5: Label: local sub
// branch occurred
6: RunFunctionOnHost( )
// Run function locally on local device
```

Figure 3:
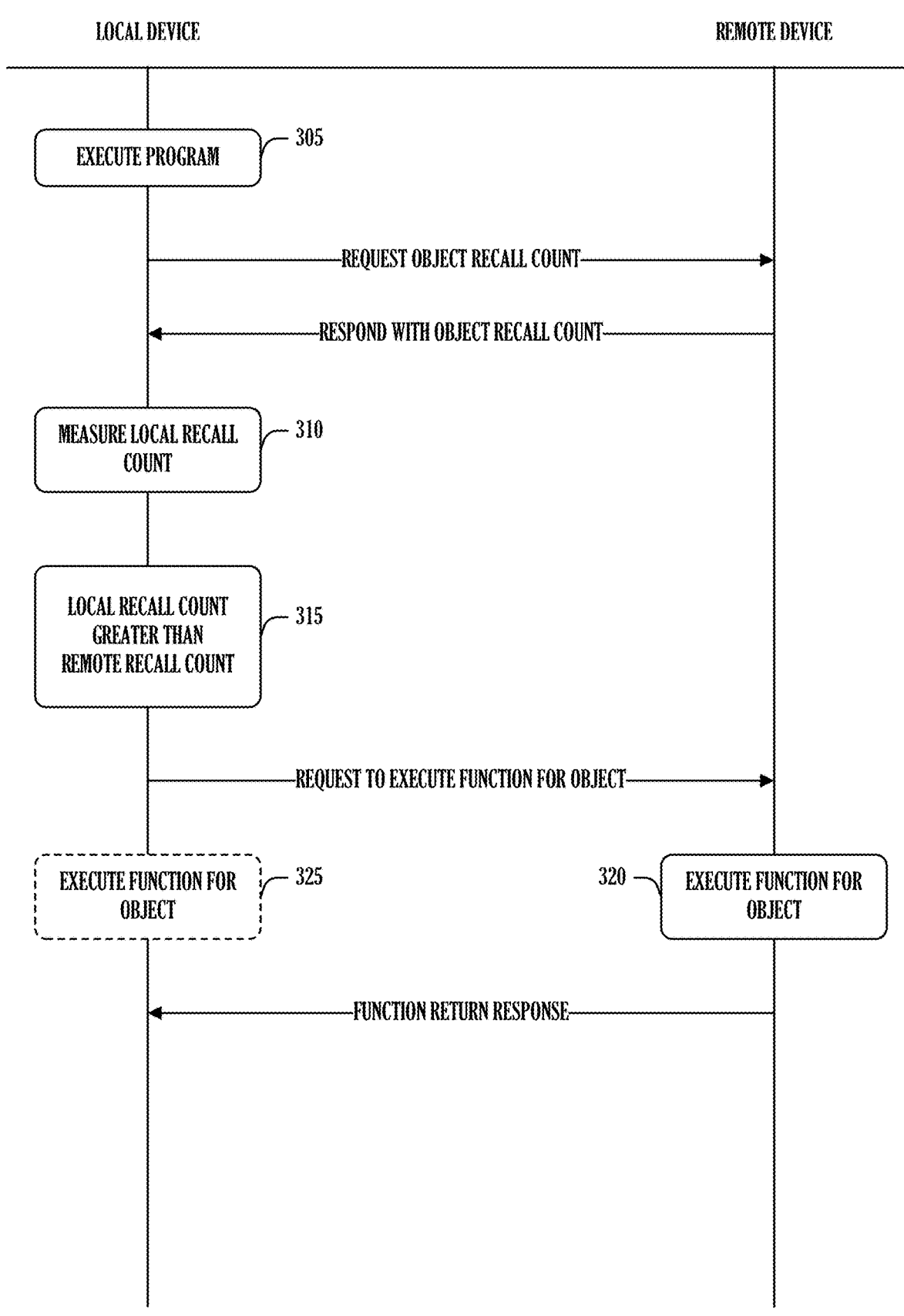
FIG. 3. Illustrates an operation and message sequence to determine where to run an operation for an object based on recall counts, according to an embodiment.

FIG. 3. Illustrates an operation and message sequence to determine where to run an operation for an object based on recall counts, according to an embodiment. A local device begins execution of a program (operation 305). A scenario in which a part of the program can be executed at the remote device arises. The local device than makes an object recall count request to the remote device and receives a response that includes the recall count for the remote device to process the part of the program. The local device then measures its own recall count (operation 310) and determines that the local recall count is greater than the remote recall count (operation 315). The local device then requests that the remote device execute the part of the program and the remote device complies (operation 320). Upon completion, the remote device notifies the local device that the program part is complete. If the result at operation 315 and been otherwise (e.g., the local recall count is less than or equal to the remote recall count), then the local device would execute the program part locally (operation 325.

Figure 4:
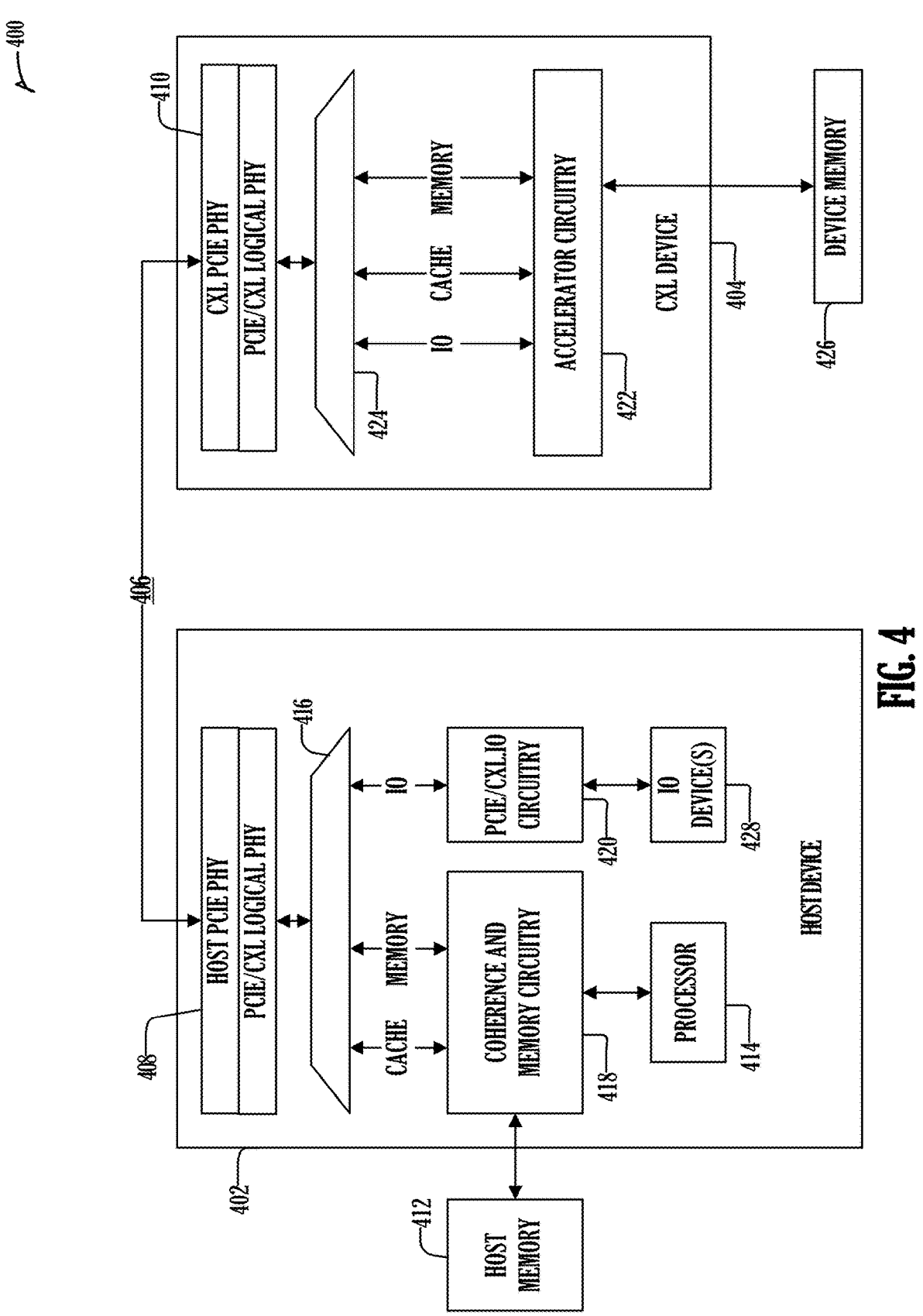
FIG. 4 illustrates an example of a host connected to a CXL device, according to an embodiment.

FIG. 4 illustrates an example of a host connected to a CXL device, according to an embodiment. FIG. 4 illustrates generally an example of a CXL system 400 that uses a CXL link 406 to connect a host device 402 and a CXL device 404 via a host physical layer PCIE interface 408 and a CXL client physical layer PCIE interface 410 respectively. In an example, the host device 402 comprises or corresponds to the first host 110 (or the second host 160) and the CXL device 404 comprises or corresponds to the memory system 125 from the example of the system 105 in FIG. 1. A memory system command manager can comprise a portion of the host device 402 or the CXL device 404. In an example, the CXL link 406 can support communications using multiplexed protocols for caching (e.g., CXL.cache), memory accesses (e.g., CXL.mem), and data input/output transactions (e.g., CXL.io). CXL.io can include a protocol based on PCIe that is used for functions such as device discovery, configuration, initialization, I/O virtualization, and direct memory access (DMA) using non-coherent load-store, producer-consumer semantics. CXL.cache can enable a device to cache data from the host memory (e.g., from the host memory 412) using a request and response protocol. CXL.memory can enable the host device 402 to use memory attached to the CXL device 404, for example, in or using a virtualized memory space. In an example, CXL.memory transactions can be memory load and store operations that run downstream from or outside of the host device 402.

In the example of FIG. 4, the host device 402 includes a host processor 414 (e.g., comprising one or more CPUs or cores) and IO device(s) 428. The host device 402 can comprise, or can be coupled to, host memory 412. The host device 402 can include various circuitry (e.g., logic) configured to facilitate CXL-based communications and transactions with the CXL device 404. For example, the host device 402 can include coherence and memory circuitry 418 configured to implement transactions according to CXL-.cache and CXL.mem semantics, and the host device 402 can include PCIe circuitry 420 configured to implement transactions according to CXL.io semantics. In an example, the host device 402 can be configured to manage coherency of data cached at the CXL device 404 using, e.g., its coherence and memory circuitry 418.

The host device 402 can further include a host multiplexer 416 configured to modulate communications over the CXL link 406 (e.g., using the PCIe PHY layer). The multiplexing of protocols ensures that latency-sensitive protocols (e.g., CXL.cache and CXL.memory) have the same or similar latency as a native processor-to-processor link. In an example, CXL defines an upper bound on response times for latency-sensitive protocols to help ensure that device performance is not adversely impacted by variation in latency between different devices implementing coherency and memory semantics.

In an example, symmetric cache coherency protocols can be difficult to implement between host processors because different architectures can use different solutions, which in turn can compromise backward compatibility. CXL can address this problem by consolidating the coherency function at the host device 402, such as using the coherence and memory circuitry 418.

The CXL device 404 can include an accelerator device that comprises various accelerator circuitry 422. In an example, the CXL device 404 can comprise, or can be coupled to, CXL device memory 426. The CXL device 404 can include various circuitry configured to facilitate CXL-based communications and transactions with the host device 402 using the CXL link 406. For example, the accelerator circuitry 422 can be configured to implement transactions according to CXL.cache, CXL.mem, and CXL.io semantics. The CXL device 404 can include a CXL device multiplexer 424 configured to control communications over the CXL link 406. The accelerator circuitry 422 can be one or more processors that can perform one or more tasks. Accelerator circuitry 422 can be a general-purpose processor or a processor designed to accelerate one or more specific workloads.f FIG. 5 illustrates example components of a memory device, according to an embodiment. The illustrated components are part of a memory controller, such as those described above (e.g., the controller 130 illustrated in FIG. 1) implementing a memory-side cache (MSC). The illustrated components include elements to address internal (e.g., from a near-memory accelerator) and external (e.g., received from a host via a CXL link) request differences used to maintain CXL protocol requirements, such as maintaining forward progress of CXL memory (CM) requests.

As illustrated, CM refers to CXL memory or other external requests and NI refers to requests coming from a NOC interface or other internal requests. Requests from CXL.mem are written to the CM Request Information Table 505. The entry in the CM Request Information Table 505 to which a request is written is obtained from the CM Request Information Table Pool 510. The CM Request Information Table Pool 510 maintains a list of indices to CM Request Information Table entries that are available (e.g., free, or unused). Requests from an accelerator within the device are written to the NI Request Information Table 515 using the NI Request Information Table Pool 520 for the available entry indices. The two pools—the CM Request Information Table Pool 510 and the NI Request Information Table Pool 520—are configured such that accelerator requests (e.g., internal requests) cannot consume all table entries. Thus, for example, if an additional NI request arrives and there is no free entry indicated in the NI Request Information Table Pool 520, the request is stalled until an entry is available. Here, the request can stay in the in-bound queue until an entry is available.

CXL.mem requests from the CM queue 525 are selected at higher priority than NI requests in the NI queue 530 to ensure forward progress of the CM requests. In an example, as illustrated, when a request is selected from either the CM queue 525 or the NI queue 530, the request information is written into the NI+CM Request Information Table 531. Hereafter, each request is represented in the various queues by an identifier (e.g., index) to an entry of the NI+CM Request Information Table 531. This arrangement can reduce the storage requirements and bandwidth in transferring the request information among the various queues at different processing points in the controller. When an aspect of the request is needed by a processing point, such as an address for a read, the identifier is used to reference the entry in the NI+CM Request Information Table 531 and retrieve the field of the request corresponding to the needed aspect. As with the CM Request Information Table 505 and the NI Request Information Table 515, a free list, or pool, of entries can be used to quickly determine which entries are available to store request information in the NI+CM Request Information Table 531.

When a request is selected, a cache tag 535 for a cache line (e.g., cache way) corresponding to an address in the request can be checked to determine whether the requests will be deferred (e.g., processed later). Deferral of the request is generally required when there is no available (e.g., free) way line entry in a cache set for the address in the request. If no deferral occurs, the cache data can be read 540 or modified 545 (e.g., for a write), and the way tag can be modified 550. Modifying the tag 550 or the cache data 545 can respectively be written to backing memory, such as in writing the tag data 555 and the cache way data 560.

When the request is deferred, the request entry identifier (e.g., from the NI+CM Request Information Table 531) is pushed to either the CM or NI defer queues 565. The way defer queues 565 are used when there is a way corresponding to the address in the request, but the way is busy (e.g., waiting for another command to complete). The set defer queues 565 are used when there is no way that corresponds to the address. The request remains queued until a way is available (e.g., not busy). In an example, there are separate CM and NI defer queues 565 for each cache set within the cache.

The external control queues 570 manage external responses to the cache, such as responses to reads or writes to the backing memory, memory controller (MC) requests, or CXL recalls. A CXL recall is a request by the memory device to regain control of a cache way from the host. The recall is requested of the host and the host communicates the control of the cache way to the memory controller, for example, in CXL meta state. This procedure can be called a bias flip as the control bias for the cache way is flipped from the host to the controller or vice versa. This technique is used to enable cache coherency between any host cache and the memory device.

The command queues 575 track requests through a variety of processing points, such as whether to push or pop requests from defer queues 565, whether a CXL recall is initiated, memory controller requests, executing a command, or executing an atomic memory operation (AMO). The reference to a long AMO is an AMO that cannot complete within a single execution cycle (e.g., a clock cycle). An AMO is a near-memory operation completed by an accelerator of the memory controller.

The illustrated control and data paths are configured such that separate storage, queuing, and request prioritization enables forward progress on CM requests while executing in the presence of NI requests. Thus, CM requests will not be delayed by an NI request.

FIG. 5 illustrates an example of an associative cache 500, according to an embodiment. Here, the associative cache 500 includes four cache sets, cache set zero 505, cache set one 510, cache set two 515, and cache set three 520. Note that each cache set corresponds to a memory address range. Thus, cache set one corresponds to all memory elements with an address prefixed by 00 while cache set three 515 corresponds to all memory elements with an address prefixed by 10. The cache lines within each cache set represent a storage element (e.g., register) sized for an element in the memory. Each cache line can also be called a "way." Thus, as illustrated, the associated cache 500 is a four-way associative cache because four ways can be used for each cache set. Generally, memory requests with addresses in one cache set will load a way until all of the ways are used. With the arrival of another memory request, a process to evict a way to load the new data can be undertaken to free the way for the new memory request.

The associative cache 500 can maintain metadata for the ways. Thus, as illustrated, the associative cache 500 includes a tag (e.g., metadata) in addition to the way data, resulting in the way zero tag and data 525, the way one tag and data 530, the way two tag and data 535, and the way three tag and data 540. Examples of tag data can include a dirty bit to indicate whether the way is out-of-sync with the backing memory, whether there is an operation to synchronize the way with host memory (e.g., a host recall is underway), or CXL meta-state, request state, among others. In an example, when the source (e.g., internal, or external) of the request impacts operation of the memory controller, the tag data can include designation of whether the request is internal or external as well as, for example, whether the request is internal and deferred, or external and deferred.

Figure 6:
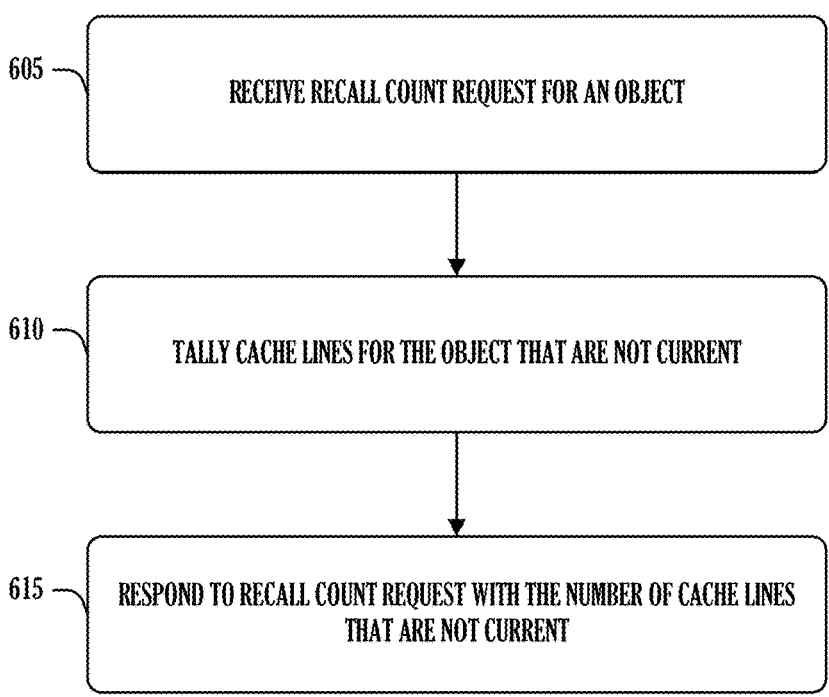
FIG. 6 illustrates a flow diagram of an example of a method for hybrid cache coherency, according to an embodiment.

FIG. 6 illustrates a flow diagram of an example of a method 600 for near-cache compute, according to an embodiment. The operations of the method 600 are performed by a device and implemented in hardware (e.g., computational hardware) such as that described above or below (e.g., processing circuitry).

At operation 605, a recall count request is received on an interface of a device from an entity. In an example, the recall count request specifies a data object. In an example, the data object is represented by a set of cache lines on the device. In an example, the data object is specified by one or more memory addresses. In an example, the one or more memory addresses are a memory address range. In an example, the interface conforms to a Compute Express Link (CXL) family of standards.

At operation 610, the number of cache lines in the set of cache lines that are inconsistent are tabulated to create a recall count. In an example, where the device interface conforms to a CXL interface, an inconsistent cache line is a modified cache line.

At operation 615, a response that includes the recall count is communicated to the entity via the interface. In an example, the method 600 can include the operation of receiving a remote function request from the entity via the interface. In this example, the remote function request is sent in response to the recall count being less than an inconsistent cache line count at the entity for the data object.

In an example, the method 600 can include the operation of performing a recall for the cache lines in the set of cache lines that are inconsistent. In this example, the device can then execute a function specified in the remote function request.

In an example, the method 600 can include the operations of transmitting, by the device, a second recall count request to a second entity, the second recall count request specifying a second data object. In response, the device receives a second recall count. Then, the device can tabulate a second number of cache lines from a set of cache lines that represent the second data object to create a local recall count. Once both the second recall count and the local recall count are in hand, the device can compare the two recall counts and select a function from a set of functions based on comparing the second recall count and the local recall count.

In an example, comparing the local recall count to the second recall count includes setting a register of the device to indicate whether the second recall count is greater than the local recall count. In an example, selecting the function includes executing a branch function that selects the function based on the register.

In an example, the function is a local function that will execute on the device when the second recall count is greater than the local recall count. In an example, the function is a remote function that will execute on the second entity when the second recall count is less than the local recall count.

In an example, the device is a near-memory compute device that includes memory addressable by the entity, and a processor configured to execute a function upon request by the entity. In an example, the function operates on data in the memory to update the data in the memory or to return a result of the manipulation to the entity.

Figure 7:
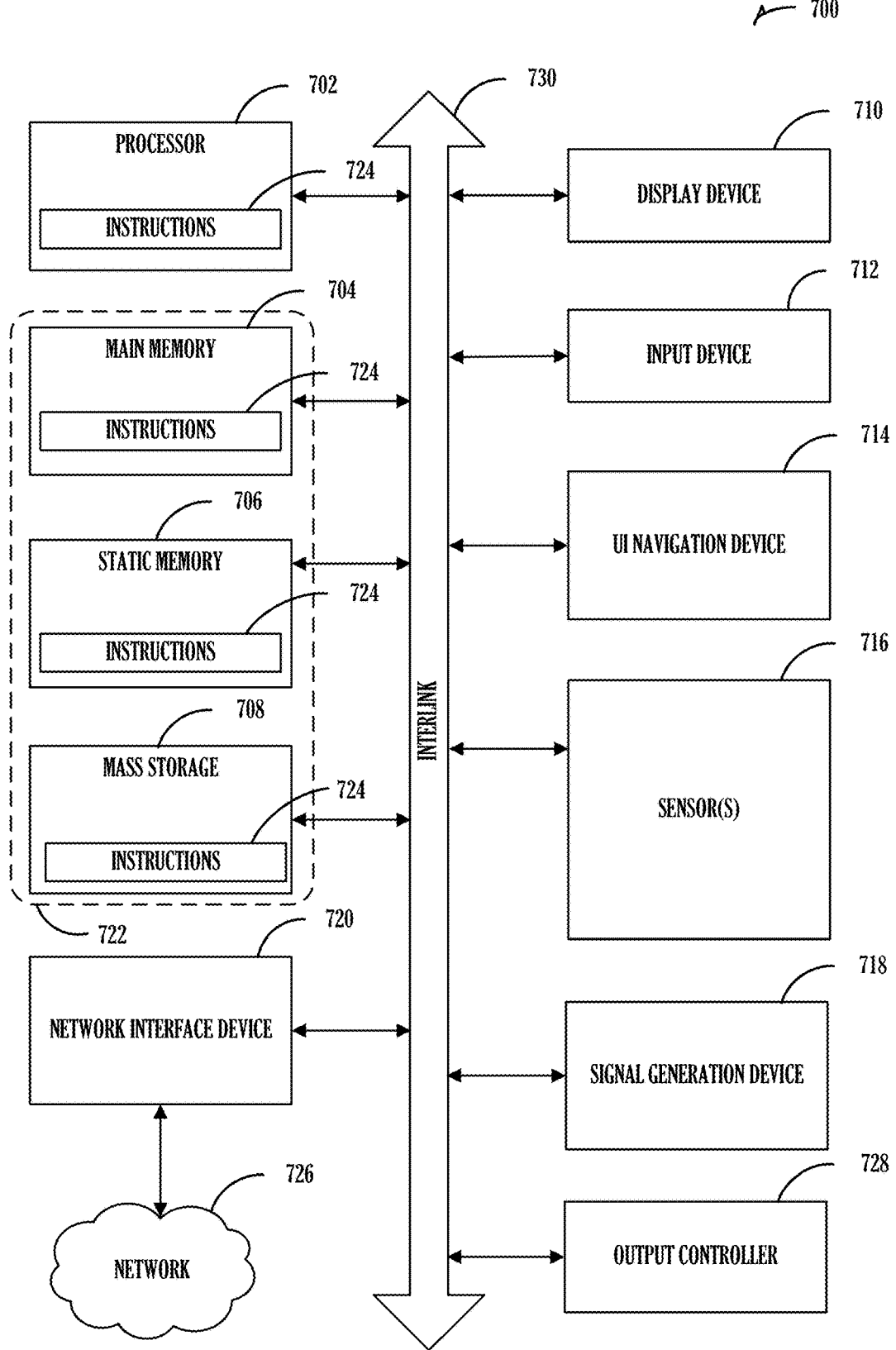
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. Examples, as described herein, may include, or may operate by, logic or a number of components, or mechanisms in the machine 700. Circuitry (e.g., processing circuitry) is a collection of circuits implemented in tangible entities of the machine 700 that include hardware (e.g., simple circuits, gates, logic, etc.). Circuitry membership may be flexible overtime. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 700 follow.

In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 700 may include a hardware processor 702 (e.g., a central processing unit (CPU), a graphics processing unit (GPU), a hardware processor core, or any combination thereof), a main memory 704, a static memory (e.g., memory or storage for firmware, microcode, a basic-input-output (BIOS), unified extensible firmware interface (UEFI), etc.) 706, and mass storage 708 (e.g., hard drives, tape drives, flash storage, or other block devices) some or all of which may communicate with each other via an interlink (e.g., bus) 730. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 708, a signal generation device 718 (e.g., a speaker), a network interface device 730, and one or more sensors 716, such as a global positioning system (GPS) sensor, compass, accelerometer, or another sensor. The machine 700 may include an output controller 738, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 702, the main memory 704, the static memory 706, or the mass storage 708 may be, or include a machine readable medium 732 on which is stored one or more sets of data structures or instructions 734 (e.g., software) embodying or utilized by any one or more of the techniques or functions described herein. The instructions 734 may also reside, completely or at least partially, within any of registers of the processor 702, the main memory 704, the static memory 706, or the mass storage 708 during execution thereof by the machine 700. In an example, one or any combination of the hardware processor 702, the main memory 704, the static memory 706, or the mass storage 708 may constitute the machine readable media 732. While the machine readable medium 732 is illustrated as a single medium, the term "machine readable medium" may include a single medium or multiple media (e.g., a centralized or distributed database, and/or associated caches and servers) configured to store the one or more instructions 734.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon-based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 732 may be representative of the instructions 734, such as instructions 734 themselves or a format from which the instructions 734 may be derived. This format from which the instructions 734 may be derived may include source code, encoded instructions (e.g., in compressed or encrypted form), packaged instructions (e.g., split into multiple packages), or the like. The information representative of the instructions 734 in the machine readable medium 732 may be processed by processing circuitry into the instructions to implement any of the operations discussed herein. For example, deriving the instructions 734 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 734.

In an example, the derivation of the instructions 734 may include assembly, compilation, or interpretation of the information (e.g., by the processing circuitry) to create the instructions 734 from some intermediate or preprocessed format provided by the machine readable medium 732. The information, when provided in multiple parts, may be combined, unpacked, and modified to create the instructions 734. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 734 may be further transmitted or received over a communications network 736 using a transmission medium via the network interface device 730 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others. In an example, the network interface device 730 may include one or more physical jacks (e.g., Ethernet, coaxial, or phone jacks) or one or more antennas to connect to the communications network 736. In an example, the network interface device 730 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software. A transmission medium is a machine readable medium.

ADDITIONAL NOTES & EXAMPLES

Example 1 is a device for near-cache compute, the device comprising: an interface configured to communicate with external entities; and processing circuitry configured to: receive a recall count request, from an entity on the interface, the recall count request specifying a data object, the data object represented by a set of cache lines on the device; tabulate a number of cache lines in the set of cache lines that are inconsistent to create a recall count; and communicate a response to the entity via the interface, the response including the recall count.

In Example 2, the subject matter of Example 1, wherein the processing circuitry is configured to receive a remote function request from the entity via the interface, the remote function request sent in response to the recall count being less than an inconsistent cache line count at the entity for the data object.

In Example 3, the subject matter of Example 2, wherein the processing circuitry is configured to: perform a recall for the cache lines in the set of cache lines that are inconsistent; and execute a function specified in the remote function request.

In Example 4, the subject matter of any of Examples 1-3, wherein the processing circuitry is configured to: transmit a second recall count request to a second entity, the second recall count request specifying a second data object; receive a second recall count in response to the second recall count request; tabulate a second number of cache lines from a set of cache lines that represent the second data object to create a local recall count; compare the local recall count to the second recall count; and select a function from a set of functions based on comparing the second recall count and the local recall count.

In Example 5, the subject matter of Example 4, wherein the device is a near-memory compute device that includes memory addressable by the entity, and wherein the processing circuitry includes a processor configured to execute a function upon request by the entity, the function including use of data in the memory and either updating the memory or returning a result of a manipulation to the entity.

In Example 6, the subject matter of any of Examples 4-5, wherein the function is a local function that will execute on the device when the second recall count is greater than the local recall count.

In Example 7, the subject matter of any of Examples 4-6, wherein the function is a remote function that will execute on the second entity when the second recall count is less than the local recall count.

In Example 8, the subject matter of any of Examples 4-7, wherein, to compare the local recall count to the second recall count, the processing circuitry is configured to set a register of the device to indicate whether the second recall count is greater than the local recall count, and wherein, to select the function, the processing circuitry is configured to execute a branch function that selects the function based on the register.

In Example 9, the subject matter of any of Examples 1-8, wherein the interface conforms to a Compute Express Link family of standards.

In Example 10, the subject matter of Example 9, wherein an inconsistent cache line is a modified cache line.

In Example 11, the subject matter of any of Examples 1-10, wherein the data object is specified by one or more memory addresses.

In Example 12, the subject matter of Example 11, wherein the one or more memory addresses are a memory address range.

Example 13 is a method for near-cache compute, the method comprising: receiving a recall count request, from an entity, on an interface of a device, the recall count request specifying a data object, the data object represented by a set of cache lines on the device; tabulating a number of cache lines in the set of cache lines that are inconsistent to create a recall count; and communicating a response to the entity via the interface, the response including the recall count.

In Example 14, the subject matter of Example 13, comprising receiving a remote function request from the entity via the interface, the remote function request sent in response to the recall count being less than an inconsistent cache line count at the entity for the data object.

In Example 15, the subject matter of Example 14, comprising: performing a recall for the cache lines in the set of cache lines that are inconsistent; and executing, by the device, a function specified in the remote function request.

In Example 16, the subject matter of any of Examples 13-15, comprising: transmitting, by the device, a second recall count request to a second entity, the second recall count request specifying a second data object; receiving a second recall count in response to the second recall count request; tabulating a second number of cache lines from a set of cache lines that represent the second data object to create a local recall count; comparing the local recall count to the second recall count; and selecting a function from a set of functions based on comparing the second recall count and the local recall count.

In Example 17, the subject matter of Example 16, wherein the device is a near-memory compute device that includes: memory addressable by the entity; and a processor configured to execute a function upon request by the entity, the function including use of data in the memory and either updating the memory or returning a result of a manipulation to the entity.

In Example 18, the subject matter of any of Examples 16-17, wherein the function is a local function that will execute on the device when the second recall count is greater than the local recall count.

In Example 19, the subject matter of any of Examples 16-18, wherein the function is a remote function that will execute on the second entity when the second recall count is less than the local recall count.

In Example 20, the subject matter of any of Examples 16-19, wherein comparing the local recall count to the second recall count includes setting a register of the device to indicate whether the second recall count is greater than the local recall count, and wherein selecting the function includes executing a branch function that selects the function based on the register.

In Example 21, the subject matter of any of Examples 13-20, wherein the interface conforms to a Compute Express Link family of standards.

In Example 22, the subject matter of Example 21, wherein an inconsistent cache line is a modified cache line.

In Example 23, the subject matter of any of Examples 13-22, wherein the data object is specified by one or more memory addresses.

In Example 24, the subject matter of Example 23, wherein the one or more memory addresses are a memory address range.

Example 25 is a machine readable medium including instructions for near-cache compute, the instructions, when executed by processing circuitry of a device, cause the device to perform operations comprising: receiving a recall count request, from an entity, on an interface of the device, the recall count request specifying a data object, the data object represented by a set of cache lines on the device; tabulating a number of cache lines in the set of cache lines that are inconsistent to create a recall count; and communicating a response to the entity via the interface, the response including the recall count.

In Example 26, the subject matter of Example 25, wherein the operations comprise receiving a remote function request from the entity via the interface, the remote function request sent in response to the recall count being less than an inconsistent cache line count at the entity for the data object.

In Example 27, the subject matter of Example 26, wherein the operations comprise: performing a recall for the cache lines in the set of cache lines that are inconsistent; and executing a function specified in the remote function request.

In Example 28, the subject matter of any of Examples 25-27, wherein the operations comprise: transmitting a second recall count request to a second entity, the second recall count request specifying a second data object; receiving a second recall count in response to the second recall count request; tabulating a second number of cache lines from a set of cache lines that represent the second data object to create a local recall count; comparing the local recall count to the second recall count; and selecting a function from a set of functions based on comparing the second recall count and the local recall count.

In Example 29, the subject matter of Example 28, wherein the device is a near-memory compute device that includes memory addressable by the entity, and wherein the processing circuitry is a processor configured to execute a function upon request by the entity, the function including use of data in the memory and either updating the memory or returning a result of a manipulation to the entity.

In Example 30, the subject matter of any of Examples 28-29, wherein the function is a local function that will execute on the device when the second recall count is greater than the local recall count.

In Example 31, the subject matter of any of Examples 28-30, wherein the function is a remote function that will execute on the second entity when the second recall count is less than the local recall count.

In Example 32, the subject matter of any of Examples 28-31, wherein comparing the local recall count to the second recall count includes setting a register of the device to indicate whether the second recall count is greater than the local recall count, and wherein selecting the function includes executing a branch function that selects the function based on the register.

In Example 33, the subject matter of any of Examples 25-32, wherein the interface conforms to a Compute Express Link family of standards.

In Example 34, the subject matter of Example 33, wherein an inconsistent cache line is a modified cache line.

In Example 35, the subject matter of any of Examples 25-34, wherein the data object is specified by one or more memory addresses.

In Example 36, the subject matter of Example 35, wherein the one or more memory addresses are a memory address range.

Example 37 is a system for near-cache compute, the system comprising: means for receiving a recall count request, from an entity, on an interface of the system, the recall count request specifying a data object, the data object represented by a set of cache lines on the system; means for tabulating a number of cache lines in the set of cache lines that are inconsistent to create a recall count; and means for communicating a response to the entity via the interface, the response including the recall count.

In Example 38, the subject matter of Example 37, comprising means for receiving a remote function request from the entity via the interface, the remote function request sent in response to the recall count being less than an inconsistent cache line count at the entity for the data object.

In Example 39, the subject matter of Example 38, comprising: means for performing a recall for the cache lines in the set of cache lines that are inconsistent; and means for executing a function specified in the remote function request.

In Example 40, the subject matter of any of Examples 37-39, comprising: means for transmitting a second recall count request to a second entity, the second recall count request specifying a second data object; means for receiving a second recall count in response to the second recall count request; means for tabulating a second number of cache lines from a set of cache lines that represent the second data object to create a local recall count; means for comparing the local recall count to the second recall count; and means for selecting a function from a set of functions based on comparing the second recall count and the local recall count.

In Example 41, the subject matter of Example 40, wherein the system is a near-memory compute device that includes: memory addressable by the entity; and a processor configured to execute a function upon request by the entity, the function including use of data in the memory and either updating the memory or returning a result of a manipulation to the entity.

In Example 42, the subject matter of any of Examples 40-41, wherein the function is a local function that will execute on the system when the second recall count is greater than the local recall count.

In Example 43, the subject matter of any of Examples 40-42, wherein the function is a remote function that will execute on the second entity when the second recall count is less than the local recall count.

In Example 44, the subject matter of any of Examples 40-43, wherein the means for comparing the local recall count to the second recall count include means for setting a register of the system to indicate whether the second recall count is greater than the local recall count, and wherein the means for selecting the function include means for executing a branch function that selects the function based on the register.

In Example 45, the subject matter of any of Examples 37-44, wherein the interface conforms to a Compute Express Link family of standards.

In Example 46, the subject matter of Example 45, wherein an inconsistent cache line is a modified cache line.

In Example 47, the subject matter of any of Examples 37-46, wherein the data object is specified by one or more memory addresses.

In Example 48, the subject matter of Example 47, wherein the one or more memory addresses are a memory address range.

PNUM Example 49 is at least one machine-readable medium including instructions that, when executed by processing circuitry, cause the processing circuitry to perform operations to implement of any of Examples 1-48.

PNUM Example 50 is an apparatus comprising means to implement of any of Examples 1-48.

PNUM Example 51 is a system to implement of any of Examples 1-48.

PNUM Example 52 is a method to implement of any of Examples 1-48.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A device for near-cache compute, the device comprising:
   an interface configured to communicate with external entities; and
   processing circuitry configured to:
      receive a recall count request, on the interface, the recall count request specifying a data object, the data object represented by a set of cache lines on the device;
      tabulate a number of cache lines in the set of cache lines that are inconsistent to create a recall count; and
      communicate a response to the interface, the response including the recall count.

2. The device of claim 1, wherein the processing circuitry is configured to receive a remote function request from an entity via the interface, the remote function request sent in response to the recall count being less than an inconsistent cache line count at the entity for the data object.

3. The device of claim 2, wherein the processing circuitry is configured to:
   perform a recall for the cache lines in the set of cache lines that are inconsistent; and
   execute a function specified in the remote function request.

4. The device of claim 1, wherein the processing circuitry is configured to:
   transmit a second recall count request to a second entity, the second recall count request specifying a second data object, the recall count request coming from a first entity;
   receive a second recall count in response to the second recall count request;
   tabulate a second number of cache lines from a set of cache lines that represent the second data object to create a local recall count;

compare the local recall count to the second recall count; and select a function from a set of functions based on comparing the second recall count and the local recall count.

5. The device of claim 4, wherein the device is a near-memory compute device that includes memory addressable by the first entity, and wherein the processing circuitry includes a processor configured to execute a function upon request by the first entity, the function including use of data in the memory and either updating the memory or returning a result of a manipulation to the first entity.

6. The device of claim 4, wherein the function is a local function that will execute on the device when the second recall count is greater than the local recall count.

7. The device of claim 4, wherein the function is a remote function that will execute on the second entity when the second recall count is less than the local recall count.

8. The device of claim 4, wherein, to compare the local recall count to the second recall count, the processing circuitry is configured to set a register of the device to indicate whether the second recall count is greater than the local recall count, and wherein, to select the function, the processing circuitry is configured to execute a branch function that selects the function based on the register.

9. A method for near-cache compute, the method comprising:

receiving a recall count request on an interface of a device, the recall count request specifying a data object, the data object represented by a set of cache lines on the device;

tabulating a number of cache lines in the set of cache lines that are inconsistent to create a recall count; and communicating a response to the interface, the response including the recall count.

10. The method of claim 9, comprising receiving a remote function request from an entity via the interface, the remote function request sent in response to the recall count being less than an inconsistent cache line count at the entity for the data object.

11. The method of claim 10, comprising:

performing a recall for the cache lines in the set of cache lines that are inconsistent; and executing, by the device, a function specified in the remote function request.

12. The method of claim 9, comprising:

transmitting, by the device, a second recall count request to a second entity, the second recall count request specifying a second data object, the recall count request coming from a first entity;

receiving a second recall count in response to the second recall count request;

tabulating a second number of cache lines from a set of cache lines that represent the second data object to create a local recall count;

comparing the local recall count to the second recall count; and selecting a function from a set of functions based on comparing the second recall count and the local recall count.

13. A machine readable medium including instructions for near-cache compute, the instructions, when executed by processing circuitry of a device, cause the device to perform operations comprising:

receiving a recall count request on an interface of the device, the recall count request specifying a data object, the data object represented by a set of cache lines on the device;

tabulating a number of cache lines in the set of cache lines that are inconsistent to create a recall count; and communicating a response to the interface, the response including the recall count.

14. The machine readable medium of claim 13, wherein the operations comprise receiving a remote function request from an entity via the interface, the remote function request sent in response to the recall count being less than an inconsistent cache line count at the entity for the data object.

15. The machine readable medium of claim 14, wherein the operations comprise:

performing a recall for the cache lines in the set of cache lines that are inconsistent; and executing a function specified in the remote function request.

16. The machine readable medium of claim 13, wherein the operations comprise:

transmitting a second recall count request to a second entity, the second recall count request specifying a second data object, the recall count request coming from a first entity;

receiving a second recall count in response to the second recall count request;

tabulating a second number of cache lines from a set of cache lines that represent the second data object to create a local recall count;

comparing the local recall count to the second recall count; and selecting a function from a set of functions based on comparing the second recall count and the local recall count.

17. The machine readable medium of claim 16, wherein the device is a near-memory compute device that includes memory addressable by the first entity, and wherein the processing circuitry is a processor configured to execute a function upon request by the first entity, the function including use of data in the memory and either updating the memory or returning a result of a manipulation to the first entity.

18. The machine readable medium of claim 16, wherein the function is a local function that will execute on the device when the second recall count is greater than the local recall count.

19. The machine readable medium of claim 16, wherein the function is a remote function that will execute on the second entity when the second recall count is less than the local recall count.

20. The machine readable medium of claim 16, wherein comparing the local recall count to the second recall count includes setting a register of the device to indicate whether the second recall count is greater than the local recall count, and wherein selecting the function includes executing a branch function that selects the function based on the register.

* * * * *